United States Patent [19]
Tsai

[11] Patent Number: 5,820,235
[45] Date of Patent: Oct. 13, 1998

[54] FRONT PANEL ASSEMBLY FOR A COMPUTER MAINFRAME

[76] Inventor: Tsung-Yen Tsai, No. 22-20, Shu Jen Rd., Da Kang Tsun, Kuei San Hsiang, Taoyuan Hsien, Taiwan

[21] Appl. No.: 812,922

[22] Filed: Mar. 10, 1997

[51] Int. Cl.⁶ ............................................... A47B 96/00
[52] U.S. Cl. ......................... 312/223.2; 70/90; 220/346; 312/312
[58] Field of Search .............................. 312/223.2, 223.1, 312/306, 213, 312, 350; 49/501, 336; 70/90, 81, 97, 78; 292/175, 163; 361/683, 724, 727; 220/345, 346, 347, 351, 326, 210, 254

[56] References Cited

U.S. PATENT DOCUMENTS

| | | | |
|---|---|---|---|
| 528,059 | 10/1894 | Abrams | 70/90 X |
| 2,106,386 | 1/1938 | Tripp | 312/306 X |
| 2,182,474 | 12/1939 | Hauf | 312/312 X |
| 2,244,679 | 6/1941 | Derman | 220/345 X |
| 2,779,589 | 1/1957 | Van Dongen | 49/336 |
| 4,605,267 | 8/1986 | Rinkwich | 312/312 X |
| 5,169,218 | 12/1992 | Chu | 312/223.2 |
| 5,531,346 | 7/1996 | Mosior | 220/347 X |

*Primary Examiner*—Jose V. Chen
*Assistant Examiner*—Janet M. Wilkens
*Attorney, Agent, or Firm*—Varndell Legal Group

[57] ABSTRACT

A front panel assembly for maintaining on a mainframe of a computer, including a base frame having two longitudinal sliding grooves bilaterally disposed at the front side thereat, and a bottom cover covered on the lower half of the base frame and mounted with an air filter. A gear holder is mounted on the base frame and holds a gear, and a dust cover is mounted on the base frame and moves along the longitudinal sliding grooves between the closed and the open position. The dust cover has a longitudinal rack meshed with the gear and a locating hole at the back near the top. A latch on the base frame is forced by a spring into engagement with the locating hole of the dust guard to lock the dust guard in the closed position, and a spring-supported press button on the base frame is controlled to release the latch from the locating hole of the dust guard.

6 Claims, 6 Drawing Sheets

FRONT PANEL ASSEMBLY FOR A COMPUTER MAINFRAME

BACKGROUND AND SUMMARY OF THE INVENTION

The present invention relates to a front panel assembly for a computer mainframe, and more particularly to such a front panel assembly which is equipped with a vertically sliding dust guard for protecting the disk drivers of the computer against dust.

When a computer is not in use, the computer owner may use a plastic cover to cover the computer, so as to protect it against dust. However, it is not convenient to use a plastic cover for covering a computer. When the plastic cover is removed from the computer, the user must find a space to receive the plastic cover. Further, a plastic cover for this purpose wears quickly with use.

According to one aspect of the present invention, a base frame has two longitudinal sliding grooves bilaterally disposed at the front side thereof, a bottom cover covered on the lower half of the base frame and mounted with an air filter. A gear holder is mounted on the base frame and holds a gear, and a dust cover is mounted on the base frame and moves along the longitudinal sliding grooves between the close position and the open position. The dust cover has a longitudinal rack meshed with the gear and a locating hole at the back near the top. A latch is forced by spring into engagement with the locating hole of the dust guard to lock the dust guard in the close position. A spring-supported press button is controlled to release the latch from the locating hole of the dust guard. Because the dust guard is slidably mounted on the base frame, it is not necessary to find a space for the storage of the dust guard. Further, because the gear is meshed with the rack of the dust guard, no noise is produced when the dust guard is moved between the closed position and the open position. According to another aspect of the present invention, guide rails are provided on the back side of the dust guard, and guide blocks are provided on the base frame to match with the guide rails of the dust guard for guiding the movement of the dust guard smoothly. According to still another aspect of the present invention, springy strips are provided on the base frame, which have a respective raised stop block for stopping the dust guard in the open position. When the dust guard is pulled downward by force, the springy strips are deformed, permitting the dust guard to be disconnected from the base frame for maintenance work. According to still another aspect of the present invention, the bottom cover is a grilled cover mounted with an air filter, which has two longitudinal sliding grooves at two opposite sides respectively coupled to two sliding rails on the base frame. According to still another aspect of the present invention, a swivel hook is mounted on the base frame and turned with a key to hook on a lock ring at the back side of the dust guard in locking the dust guard in the closed position.

DETAILED DESCRIPTION OF THE PREFERRED EMBODIMENT

Figure 1:
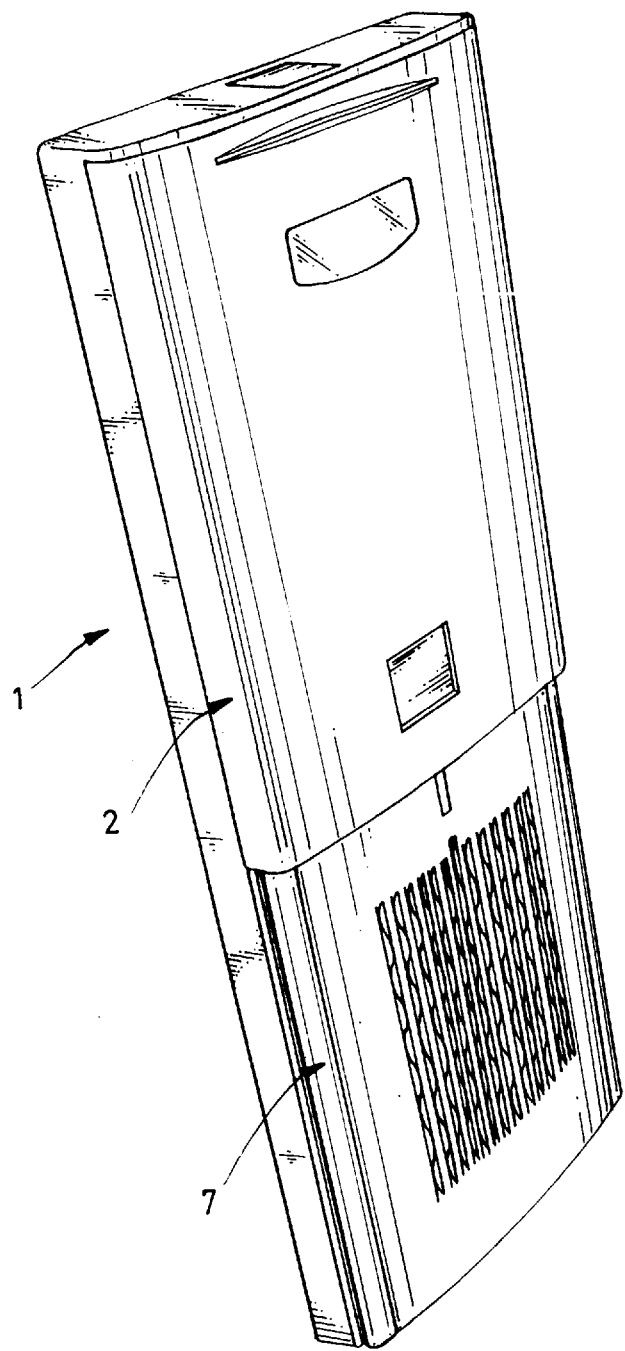
FIG. 1 is an elevational view of a front panel assembly for a computer mainframe according to the present invention, showing the dust guard closed.

Referring to Figures from 1 to 6, a front panel assembly for a computer mainframe in accordance with the present invention is generally comprised of a base frame 1, a dust guard 2, and a bottom cover 7.

The base frame 1 comprises two longitudinal sliding grooves 11 bilaterally disposed at the front side which receive two longitudinal back sliding rails 21 of the dust guard 2, a top flange 12, and a top opening 121 at the top flange 12 which receives a press button 3 and a latch 4 controlled by the press button 3. The latch 4 is forced into engagement with a locating hole 22 near the top of the dust guard (or cover) 2 to hold the dust guard 2 in the closed position. A gear holder 5 is mounted in the base frame 1 at a suitable location to hold a gear 51. The teeth of the gear 51 is meshed with a longitudinal rack 23 at the back side of the dust guard 2. Because the gear 51 is meshed with the longitudinal rack 23, the dust guard 2 is caused to descend by its gravity at a slow speed along the longitudinal grooves 11 of the base frame 1.

The base frame 1 further comprises two sets of guide blocks 14, 15; 15' adapted for guiding the movement of the dust guard 2. The dust guard 2 comprises two guide rails 24;25 raised from the back side and having a respective bottom end 241; 251 respectively inserted in between the sets of guide blocks 14, 15;15'. When the dust guard 2 is lowered along the sliding grooves 11 of the base frame 1, the downward movement of the guide rails 24; 25 are respectively guided by the guide blocks 14, 15; 15', therefore the downward movement of the dust guard 2 is stable.

The base frame 1 further comprises two springy strips 16 disposed in parallel between the guide blocks 14, 15; 15', having each a raised stop block 161 and a hooked portion 162. The dust guard 2 has two arched stop blocks 29 raised from the back side near the top. When the dust guard 2 is lowered along the sliding grooves 11 of the base frame 1, the arched stop blocks 29 will be stopped by the raised stop blocks 161 of the springy strips 16 of the base frame 1, thereby causing the dust guard 2 to be retained in the open position. However, when the dust guard 2 is pulled downwards by force, it still can be disconnected from the base frame 1 for maintenance work. The bottom cover 7 is a grilled cover mounted with an air filter 6, having two longitudinal grooves 71 respectively coupled to two longitudinal rails 18 of the base frame 1, and two top coupling holes 72 respectively coupled to the hooked portions 162 of the springy strips 16 of the base frame 1. When the bottom cover 7 is pulled downwards by force, the coupling holes 72 are disengaged from the hooked portions 162 of the springy strips 16 of the base frame 1, and therefore the bottom cover 7 is detached from the base frame 1 for maintenance work.

Figure 4:
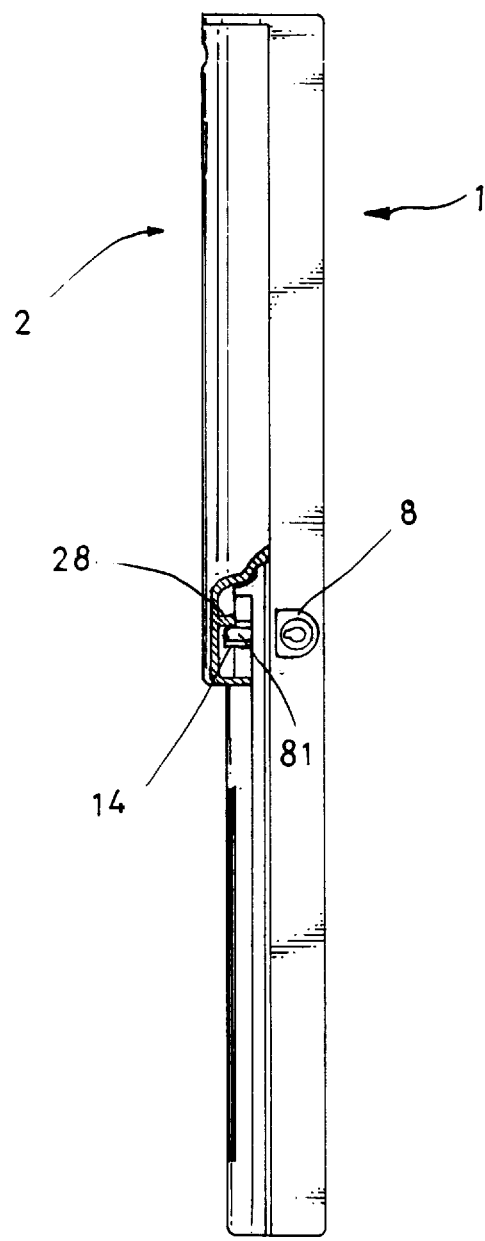
FIG. 4 is a side view in section of the present invention, showing the dust guard locked in the closed position.
Figure 5:
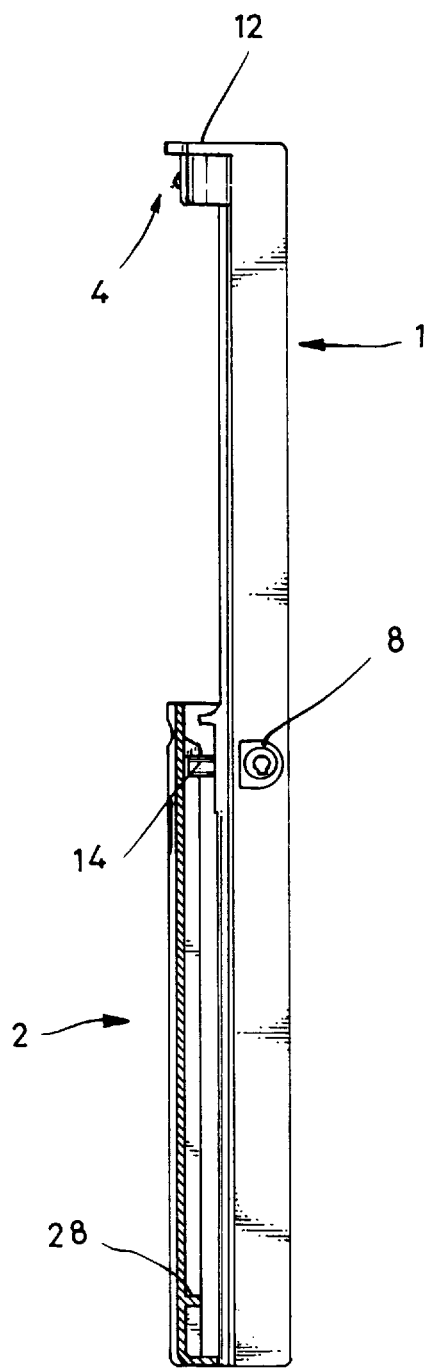
FIG. 5 is another side view in section of the present invention, showing the dust guard moved to the open position.
Figure 6:
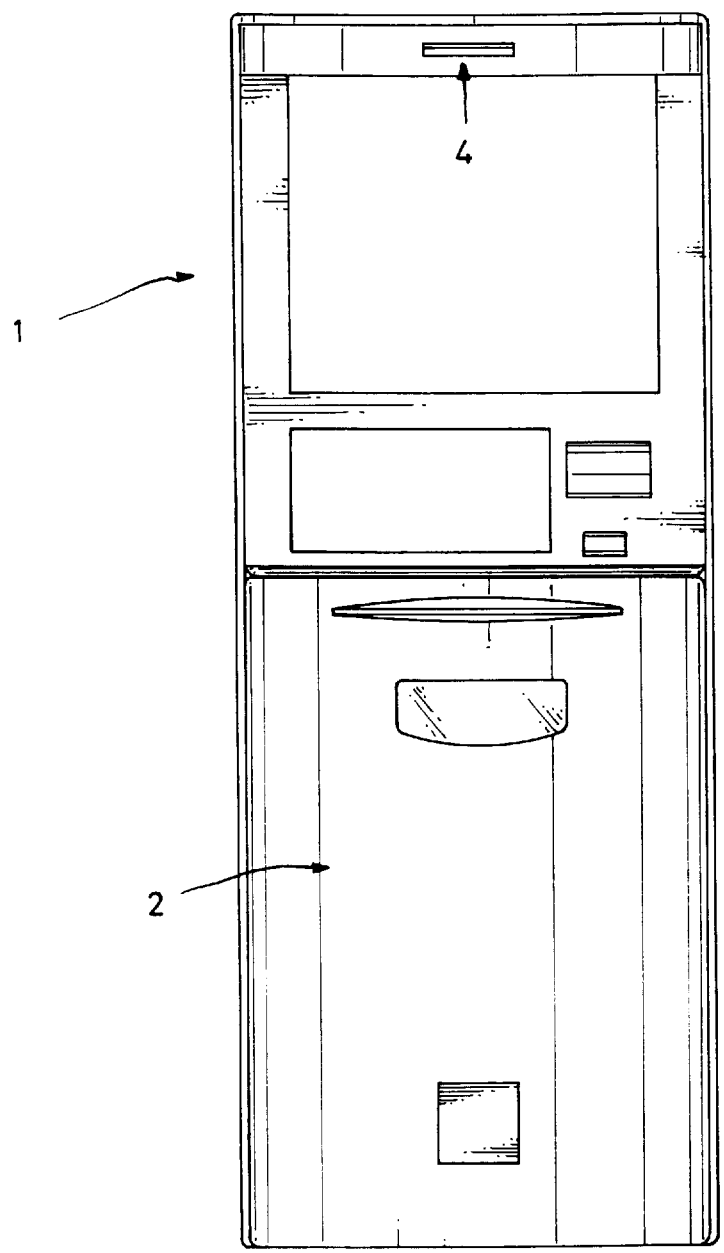
FIG. 6 is another elevational view of the present invention, showing the dust guard opened.

The base frame 1 is mounted with a lock 8 (see FIG. 4) controlled by a key to turn a swivel hook 81, causing it to hook on a lock ring 28 at the back side of the dust guard 2. Therefore, the dust cover 2 can be locked in the closed position when the computer is not in use.

Figure 2:
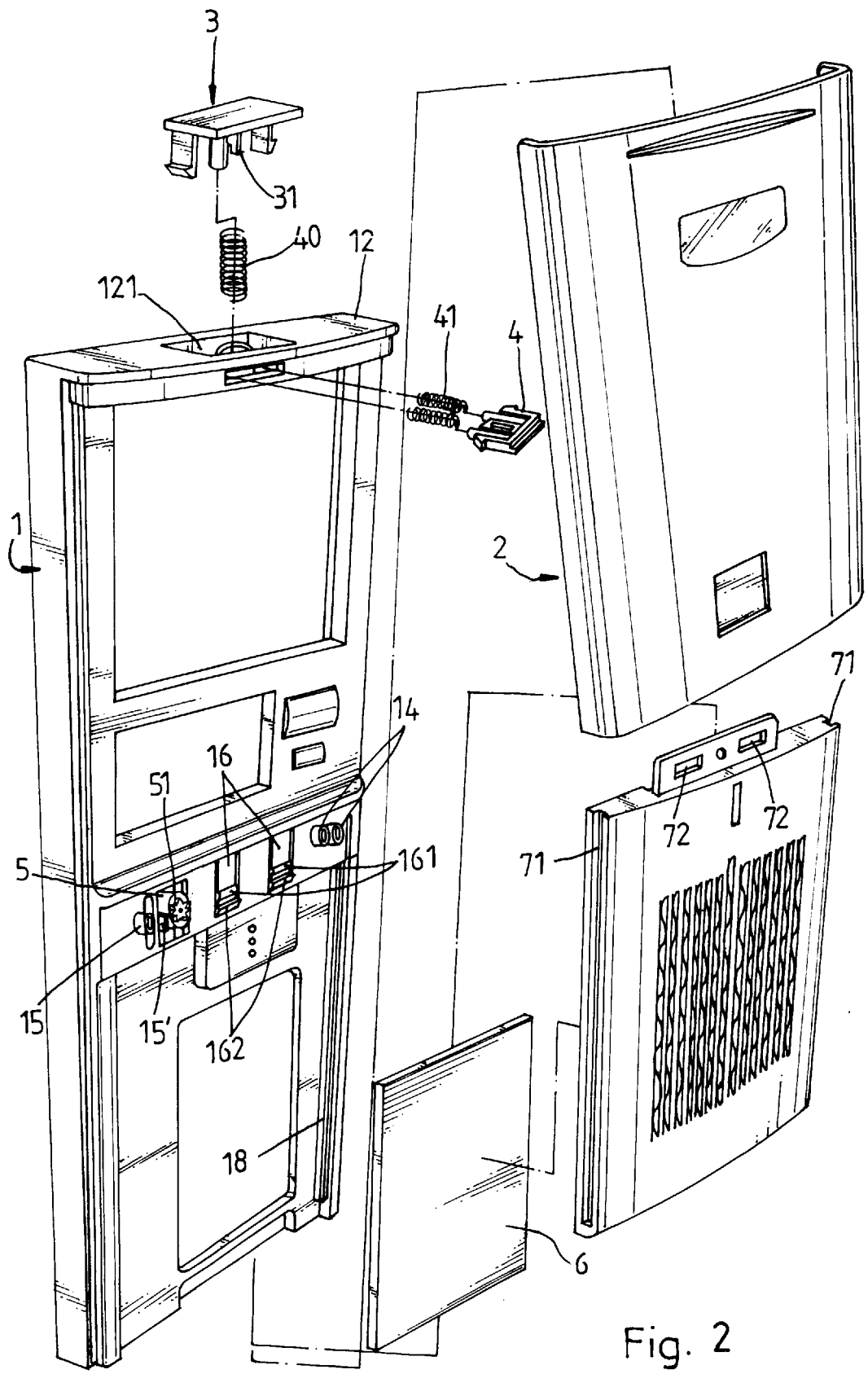
FIG. 2 is an exploded view of the front panel assembly shown in FIG. 1.
Figure 3:
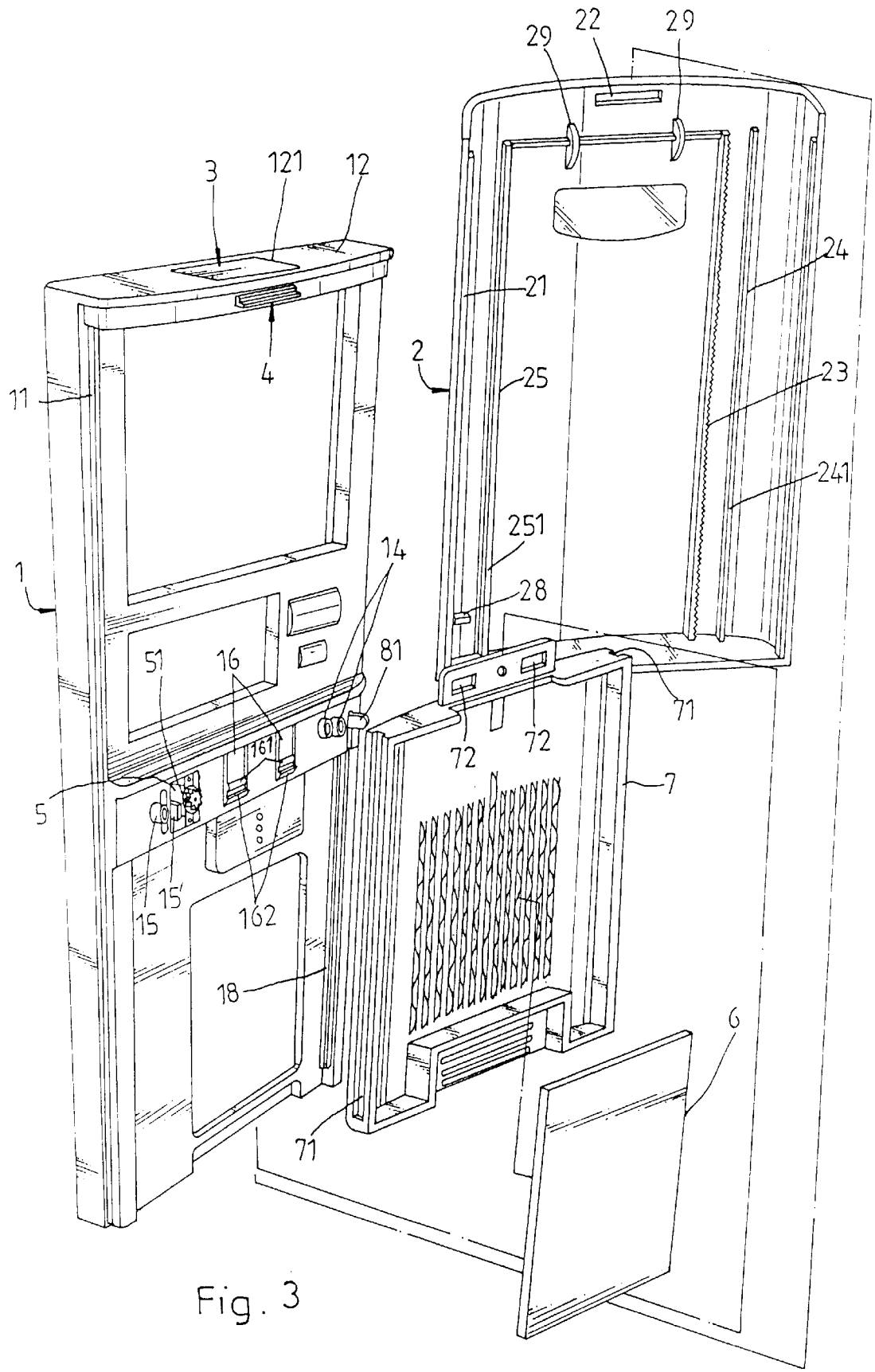
FIG. 3 is another exploded view of the front panel assembly shown in FIG. 1, showing the back side structure of the dust guard and the bottom cover.

Referring to FIGS. 1 and 2 again, the press button 3 is supported on a spring 40 in the top opening 121 of the top flange 12 of the base frame 1, having a downward actuating rod 31 for linking the latch 4. The latch 4 is supported on springs 41. The springs 41 impart on outward pressure to the latch 4. When the press button 3 is depressed, the latch 4 is pulled backwards from the locating hole 22 of the dust guard 2 by the downward actuating rod 31. On the contrary, when the press button 3 is released, it is pushed upwardly back to its former position by the spring 40, and the latch 4 is forced outwards by the springs 41 into engagement with the locating hole 22 of the dust guard 2 again.

As indicated above, when the press button 3 is depressed, the latch 4 is pulled backwards and released from the locating hole 22 of the dust guard 2, permitting the dust guard 2 to fall from the closed position to the open position and stopped outside the bottom cover 7 by the raised stop blocks 161 of the springy strips 16 of the base frame 1. When the computer is not in use, the dust guard 2 is pushed upwards, and the arched stop blocks 29 are forced over the raised stop blocks 161 of the springy strips 16 of the base frame 1, and therefore the dust guard 2 can be smoothly moved from the open position to the closed position. When the dust guard 2 is moved to the closed position and covered over the upper part (in which the disk drivers/CD-ROM, etc., of the computer are installed) of the base frame 1. The latch 4 is automatically forced by the spring 41 into engagement with the locating hole 22 of the dust guard 2 to hold the dust guard 2 in the close position, and then the lock 8 is operated to turn the swivel hook 81 into engagement with the lock ring 28 of the dust guard 2 to lock to dust guard 2 in the closed position.

I claim:

1. A front panel assembly for a mainframe of a computer, which comprises:

a base frame having a horizontal top flange, a top opening in said horizontal top flange, and a front with two bilaterally disposed longitudinal sliding grooves;

a bottom cover covering a lower part of said base frame;

a gear holder mounted on said base frame above said bottom cover and holding a gear;

a dust cover mounted on said base frame and movable between a first position where said dust cover covers an upper part of said base frame, and a second position where said dust cover covers said bottom cover, said dust cover comprising two longitudinal sliding rails movable along said longitudinal sliding grooves of said base frame, a longitudinal rack meshed with said gear, and a top with a locating hole at a back side thereof;

a latch horizontally mounted in said top opening of said top flange of said base frame and inserted into said locating hole of said dust cover for holding said dust cover in said first position; and a press button vertically mounted in said top opening of said top flange of said base frame and controlled to release said latch from said locating hole of said dust cover.

2. The front panel assembly of claim 1, wherein said dust cover has a back with two longitudinal guide rails; said base frame has a front side with two sets of guide blocks raised from said front side and adapted for guiding said longitudinal guide rails of said dust cover when said dust cover is moved along said longitudinal sliding grooves of said base frame.

3. The front panel assembly of claim 1, wherein said base frame has two springy strips having a respective raised stop block; said dust cover has a back side with a top and two arched stop blocks raised from said back side near said top, said arched stop blocks of said dust cover being respectively stopped at said raised stop blocks of said springy strips when said dust cover is moved from said first position to said second position.

4. The front panel assembly of claim 3, wherein said base frame has a front side with two bilaterally disposed longitudinal rails at said front side; said springy strips of said base frame have a respective hooked portion; said bottom cover is a grilled cover including an air filter; said bottom cover comprises two longitudinal grooves at opposite sides respectively coupled to said longitudinal rails of said base frame, and two coupling holes respectively forced into engagement with said hooked portions of said springy strips of said base frame.

5. The front panel assembly of claim 1, further comprising a lock adapted for locking said dust cover in said first position, said lock comprising a lock ring fixedly mounted on a back side of said dust cover, and a swivel hook mounted on said base frame and turned to hook on said lock ring.

6. The front panel assembly of claim 1, further comprising first spring means mounted in said top opening of said top flange of said base frame to support said press button and to impart an upward pressure to said press button, and second spring means mounted in said top opening of said flange of said base frame to support said latch and to force said latch into engagement with said locating hole of said dust cover.

* * * * *